United States Patent Office 3,417,704
Patented Dec. 24, 1968

3,417,704
CENTRIFUGAL PUMP HAVING AN IMPELLER SHAFT MOUNTED ON A ROTATING BEARING
David B. Pall, Roslyn Estates, and Joseph F. Campolong, Oyster Bay, N.Y., assignors, by mesne assignments, to Laboratories for Electronics, Inc., Waltham, Mass., a corporation of Delaware
Filed Feb. 1, 1967, Ser. No. 613,305
17 Claims. (Cl. 103—87)

ABSTRACT OF THE DISCLOSURE

A centrifugal canned motor pump is provided in which the impeller shaft is supported by front and rear rotating bearings. The bearings are mounted within bearing supports and are fixed to the shaft for rotation therewith. The material of which the bearings are made wears at a rate that exceeds that of the material of the bearing support. Thus, as the shaft rotates, bearing wear occurs uniformly over the entire circumferential surface of the bearing.

---

This invention relates to a centrifugal pump having a rotating bearing, and more particularly, it relates to a centrifugal canned pump having a bearing fixed to the impeller shaft of the pump for rotation therewith and supported on a matching fixed bearing support of a harder material than the bearing.

The main shaft or impeller shaft of a pump is normally rotatably supported in the pump housing on fixed bearings. The bearings are normally fixed to the housing in proximity to each end of the shaft, and are designed to permit rotation of the shaft in the bearing with a minimum of wear. As the bearings become worn, however, the shaft can begin to wear, and it can be severely damaged if worn bearings are not replaced in time. Moreover, in a canned pump, bearing failure can result in damage to the motor as well as to the shaft. Damage to the shaft may require expensive machining of the shaft, or even its replacement. However, damage to the motor may require that the entire pump be replaced. Thus the problem has proved to be quite a costly one.

Bearing wear in a pump normally results from friction between the surface of the bearing, and the surface of the shaft as the shaft rotates within the bearing. Since the shaft rotates quite rapidly, high temperatures can be developed, due to the friction between the bearings and the shaft, and this also increases the rate of bearing wear.

In a canned or submersible pump, the pumped fluid is often circulated to the bearings, to dissipate the heat caused by friction, and provide lubrication to reduce friction between the surface of the bearing and the shaft. U.S. Patent No. 2,741,990 to White discloses a canned pump having bearings lubricated and cooled in this way.

This solution, however, has not been adequate, since the problem of bearing wear is further complicated by the fact that many pumps are normally disposed with the main shaft in a horizontal position. Thus, the shaft, due to its own weight, imposes a net radial force on the bearings. In centrifugal pumps the shaft is also subject to a hydraulic imbalance of forces caused by impeller of the pump and this further contributes to the radial load on the shaft. Thus, the portion of the bearing subject to the radial load received more rapid wear than other portions of the bearing, due to the greater frictional forces which are developed at that point. Thus, the bearing tends to wear eccentrically. For this reason, horizontal centrifugal pumps can develop failure extremely rapidly with damage to the shaft.

In accordance with the instant invention, it has been discovered that this problem can be susbtantially reduced by providing a bearing or wear sleeve fixed to the shaft for rotation therewith, and rotatably supported in a fixed bearing support surfaced with a material that is more wear-resistant than the surface of the bearing. Thus, although a net radial force on the bearing still exists, since the bearing rotates, wear is distributed over the entire surface of the bearing within the support, and thus eccentric wear does not result. Furthermore, since wear now occurs not between the shaft and the bearing, but between the bearing and bearing support surfaces, and these are located further from the center of rotation, more surface area is available for wear than was previously the case. In any case, the wear when it occurs does not affect the entire shaft, but only a replaceable bearing attached thereto.

Attempts have been made in other fields to protect rotating shafts from wear by placing a wear sleeve around the shaft. See U.S. Patent No. 2,650,142 to Wakley and U.S. Patent No. 2,481,931 to Kester. However, the prior art did not provide a relatively soft bearing fixed to a shaft which rotates within a relatively hard support to compensate for the radial load imposed by the weight of the shaft.

This invention provides a centrifugal motor pump, comprising, in combination, a housing having an inlet and an outlet; an impeller rotatably mounted within the housing; an impeller shaft supporting the impeller; and a bearing assembly supporting the impeller shaft, said bearing assembly comprising a bearing support fixed in a position relative to the shaft, and a bearing fixed to the shaft for rotation therewith, and disposed to rotate against the bearing support, said bearing having a surface of a material that wears at a rate that exceeds the rate of wear of the surface of the bearing support, whereby as the shaft rotates, the bearing surface is worn more rapidly than the bearing support surface.

Preferably, the pump of this invention is a canned pump, enclosed in a housing including a rotor chamber, a stator chamber, and a pump chamber. The stator is disposed in the stator chamber, and the main shaft and the rotor in the rotor chamber. The main shaft or impeller shaft is supported in this chamber by at least one bearing fixed thereto which itself is rotatably supported against a bearing support fixed within the housing.

In the preferred embodiment of this invention, the bearing is cylindrical, and fits within a cylindrical socket in the support. However, the bearing can also be tapered and fit within a matching tapered socket. The bearing preferably is formed in one piece, but it also can be formed in segments.

If a tapered bearing and bearing support are provided, it is desirable to provide bias means such as a spring to maintain the tapered bearing in close contact with the corresponding bearing support, and thus take up the loss in bearing material due to wear. This construction will be explained in greater detail below.

The bearing can be fixed to the shaft for rotation therewith in a number of ways. For example, it can be press-fitted, shrink-fitted, welded, brazed, or bonded to the shaft. However, the preferred method of securing the bearing to the shaft for rotation therewith is by providing an axial slot in the inner surface in the bearing and in the shaft and disposing a key in these slots to retain them in radial alignment while not preventing relative axial movement. This configuration prevents rotation of the bearing relative to the shaft, and also facilitates the easy removal of the bearing from the shaft when it is worn, by slipping the bearing axially off the shaft.

The surface of the bearing is of a material that wears at a greater rate than that of the bearing support. It can be merely surfaced with the material, or it can be made of such material, or fitted with a liner of such material.

Relatively soft materials such as carbon, brass, bronze, lead, and alloys of copper, tin, lead and zinc are appropriate. Cadmium based alloys as well as aluminum alloys are also suitable. It is also possible to utilize a steel bearing coated with copper and/or an electro-plating of silver. Porous bearings, made by pressing mixtures of copper, tin, graphite, iron and the like, and sintering these together to form a bearing material which is then impregnated with oil, can also be used. Such bearings have the attribute that they need not be lubricated for long periods of time.

Slippery plastic materials such as polytetrafluoroethylene (Teflon), trichlorofluoroethylene (Kel-F), polystyrene, polycarbonates, and polyamides, such as nylon, can also be used. These do not require lubrication.

The bearing support can comprise a socket or a pin support for the bearing, and it will be generally shaped to accommodate the exterior of the bearing, to fit within a socket at the end of the shaft. It can be composed, if desired, of two portions, one a support member, the second, a hardened bearing liner which is located between the bearing support and the bearing. Such a bearing liner can be fixed in position, relative to the bearing support, by providing retaining pins or the like. The bearing support, however, need not be provided with a liner but could itself provide the surface against which the bearing rotates. This support can, if desired, be coated or plated with a smooth and hard wear resisiting material serving as the surface, such as chromium. It can also be made wholly of such material.

It is also possible to provide grooves, apertures or slots in the bearing liner or support through which lubricating and cooling fluids can be supplied to the bearing. Another method by which lubricating of the bearing can be achieved is to provide a small clearance between the bearing and the bearing liner within which lubricating fluid can be passed.

The surface of the bearing support should wear at a rate that is less than that of the bearing. As indicated above, the bearing support can have as the surfacing material a bearing liner or a wear-resisting coating, and thus the entire bearing support need not be made of a wear-resistant material. It is sufficient if this lining or surface coating wears at a rate that is less than that of the bearing.

Suitable metals for the bearing liner, the coating for the bearing support, or for the support itself are nickel, and nickel alloys, such as monel and Hastalloy steel, and steels, and stainless steels having Rockwell hardnesses as high as 50 Rockwell C. These materials are preferably cold worked and are well suited for use in pumps for corrosive fluids. Alloys of steel such as chromium and molybdenum steels and chromium-vanadium steels are also suitable. The surface of the bearing supports which contains the bearing naturally should be smooth and preferably be polished to minimize friction and thereby reduce bearing wear.

Figure 1:
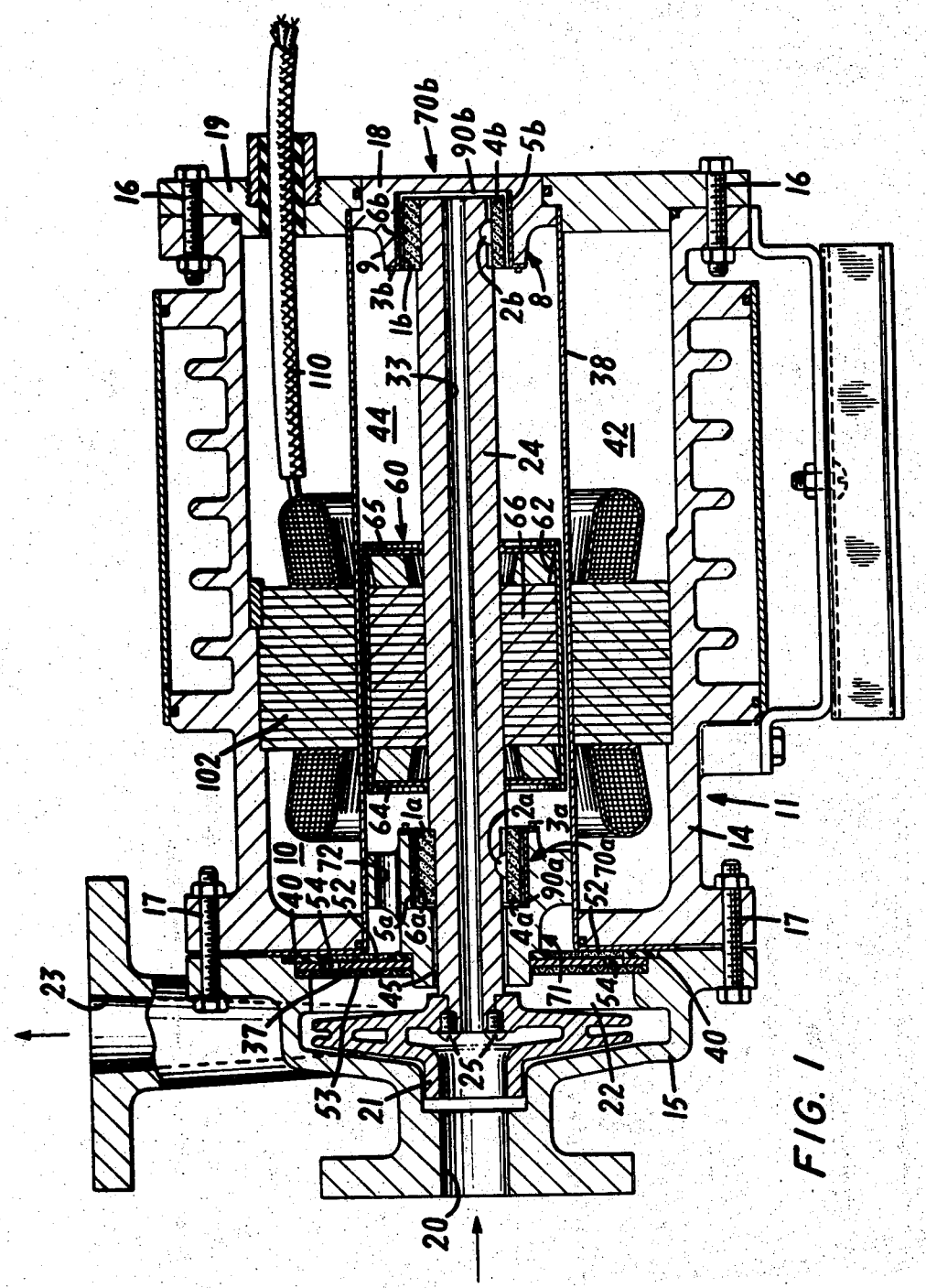
FIGURE 1 is a cross-sectional view of a canned pump having a wear-resisting bearing in accordance with the instant invention.

The submersible or canned pump shown in FIGURE 1 comprises a housing 11 which is composed of two sections, a motor section 14 and a pump section 15. These are held together by bolts 17. The rear of the motor section is closed off by an annular end plate 19, held thereto by bolts 16 and an inner circular end plate 18. Leakage between the joint of the pump section 15 and the motor section 14 is prevented by gasket 40.

The pump section includes a pump chamber 22, having an inlet 20 and an outlet 23. An impeller 21 is positioned in the pump chamber to intercept and centrifugally throw fluid entering the inlet and pump fluid to the outlet 23. The impeller 21 is fixed to an impeller shaft 24 by two bolts 25. The impeller shaft 24 extends from the pump chamber 22 into and through the motor chamber 10 and is supported therein by front and rear bearing assemblies 70a and 70b, respectively. The shaft 24 has a central axial bore, constituting a channel 33 along its length. This axial channel 33 extends from the impeller end to the other end of the impeller shaft and is open at both ends.

The pump chamber 22 is separated from the motor chamber 10 by an annular plate 37, which is spaced from the face of housing section 14. This plate has a plurality of apertures 54 therethrough distributed along its periphery. These apertures communicate with passages 52 defined between the faces of plate 37 and housing 14, and opening into the motor chamber 10. Thus, fluid is free to pass into the motor chamber, to cool and lubricate the bearings 70.

A wire mesh screen filter 53 is disposed across the apertures 54 to prevent dirt particles from entering chamber 10 with any fluid passing therethrough.

The motor housing section 14 contains a cylindrical stator cup shell 38, which divides the motor section into a stator chamber 42 and a rotor chamber 44. The stator chamber 42 is annular, and is formed between the motor housing 14, and the stator cup shell 38. The stator 102 is fixed therein, and is connected to a power source (not shown) by wires 110.

The rotor assembly 60 is situated in the rotor chamber 44 and is fixed to the main shaft 24, and rotates therewith. This assembly comprises a can 62 having a front cover 64 and a rear cover 65. This can 62 encloses the rotor coils 66.

Figure 2:
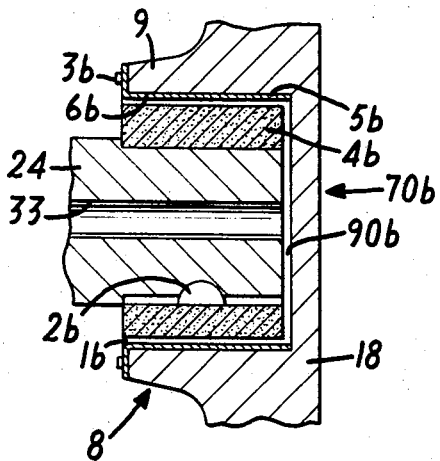
FIGURE 2 is a view in cross-section of a portion of FIGURE 1, enlarged to show the bearing assembly in greater detail.

Front and rear bearing assemblies 70a and 70b are located within the stator cup shell 38. The rear and front bearing assemblies are similar, and the typical rear assembly can best be seen by reference to FIGURE 2. The front bearing assembly 70a is annular in cross-section and the main shaft 24 extends through its central annular opening. The rear end of the shaft 24 extends into and is supported by the rear bearing assembly 70b.

The front bearing assembly 70a is composed of bearing support 71 having a cylindrical front bearing 4a. A bearing liner 5a is disposed between the front bearing 4a and the bearing socket 6a and is fixed in position by pins 7a.

A plurality of apertures 72 are provided in the front bearing support 71 to allow the passage of fluid from the passages 52 into the rotor chamber 44.

The rear bearing assembly 70b (best seen in FIGURE 2) is composed of a bearing support 8 that is formed in the rear central plate 18. An annular flange 9 on the plate 18 forms the bearing socket 6b. A bearing liner 5b is disposed within the bearing socket 6b and encloses the rear bearing 4b. The bearing liner 5b is fixed in position by pins 3b.

The front and rear bearings 4a and 4b slip over the shaft 24, and are fixed to the shaft for rotation therewith by means of Woodruff keys 2a and 2b.

A small clearance 1a is provided between the front bearing 4a and the front bearing liner 5a, to allow pumped fluid to form a lubricating film therebetween. This fluid can circulate from the chamber 44 through the clearance 1a into radial passages 27 between the end of the bearing 4a and the bearing support and then back into the impeller chamber through a small clearance 45 between the shaft 24 and the bearing support 71. This fluid can pass to the rear bearing through a similar passage system 1b and 90b and then flow back to the impeller chamber through the central axial passage 33.

In the preferred embodiment, the bearing supports 71 and 8 are made of steel and the bearing liners 5a and 5b are made of polished hardened stainless steel. The bearing liners 5a and 5b can be fixed by pins 3a and 3b to the bearing supports 71 and 18. The bearings 4a and 4b are made of carbon. Thus, the bearings will wear at a more rapid rate than the bearing liners 5a and 5b.

Since the bearings rotate with the shaft, the surfaces that experience frictional wear are the exterior circumference of the bearings and the interior circumference of the bearing liner. The carbon bearings wear at a rate that exceeds that of the bearing liners, and thus will be worn before the bearing liner is worn. As the shaft rotates, since the surfaces of the bearings that wear are rotating surfaces, uneven wear does not result, although there is a radial load thereon, due to the weight of the shaft. When the bearings are eventually worn, they can be readily replaced by merely sliding the bearings axially of the end of the shaft and replacing them with new bearings. Thus, no machining of the shaft or the bearing supports need be carried out.

Figure 3:
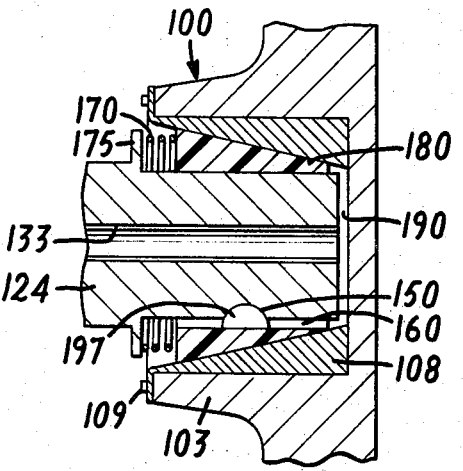
FIGURE 3 is a view in cross-section similar to that of FIGURE 2, showing a tapered form of a bearing assembly.

In FIGURE 3, another embodiment of the bearing assembly is shown, adapted for supporting the rear end of an impeller shaft, as in FIGURE 1. In this embodiment, the bearing assembly includes a support 100 having an extended flange 103 which forms a bearing socket. A tapered stainless steel polished and hardened bearing liner 108 is disposed within the bearing socket, and is fixed to the bearing support 100 by pins 109.

The main shaft 124 has a central passage 133. This passage communicates with an end space or passage 190.

The tapered bearing 180 is composed of Teflon polytetrafluoroethylene. It is slipped over and is held to the shaft for rotation therewith by a key 197. This key is fitted in a slot in a shaft 150 and in a slot 160 in the bearing. The bearing is held against the bearing liner by a coil spring 170 which bears against the bearing and against a flange 175 on the shaft 124. In this embodiment, as in the previous embodiment, as the shaft rotates, the bearing rotates with it, and thus is evenly worn. However, in this embodiment, as the bearing wears, although material is lost due to wear of the bearing no clearance between the bearing and the liner results. The bearing material lost is compensated for by the spring 170 which maintains the bearing in position against the bearing liner. Thus, this assembly both provides even wear, although subject to a radial load, and also compensates for this wear.

Figure 4:
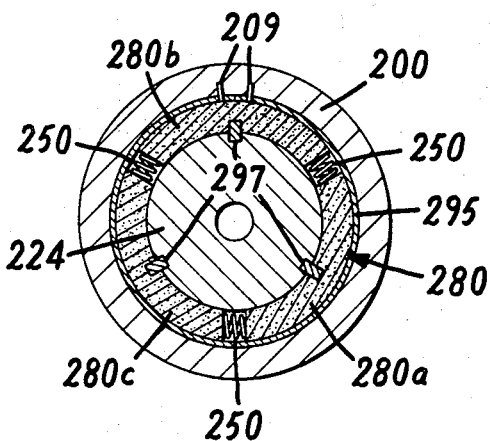
FIGURE 4 is a view in cross-section of a segmented bearing assembly of this invention.

A third embodiment of the bearing assembly is shown in FIGURE 4. The bearing 280 shown in this embodiment is cylindrical and is composed of three segments 280a, and 280b and 280c. Each of these segments is held for rotation with the shaft by keys 297. Springs 250 are disposed between each segment of the bearing. These can be compression springs, clip springs or the like. These springs force the segments of the bearing outwardly and hold the segments against a bearing liner 295 in support 200 which encloses the bearing.

The bearing liner 295 is secured to the bearing support 200 by pins 209. The bearing in this embodiment is made of babbit and the bearing liner is made of hardened polished stainless-steel.

In this embodiment, as the shaft rotates, the bearing rotates with it, and is worn evenly although it is subjected to a radial load. This embodiment also compensates for wear of the bearing since the springs tend to force the bearing segments outwardly as the outer surface thereof is worn away, and thus maintain the bearing against the bearing liner.

Figure 5:
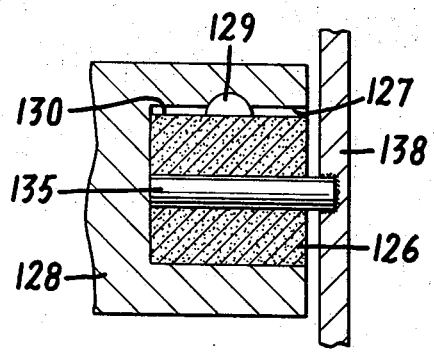
FIGURE 5 is a view in cross-section of a pin supported bearing assembly of this invention.

An embodiment of this invention in which the bearing is supported on a pin is shown in FIGURE 5. The bearing 126 is cylindrical and is fitted within a cylindrical socket 127 formed in the shaft 128. The bearing is fixed to the shaft for rotation therewith by a Woodruff key 129, that is disposed in an axial slot 130 at the outer periphery of the bearing. A pin 135 supported on a backplate 138 is fitted within a central tubular passage in the bearing. The shaft and the bearing rotate around this pin and the outer surface of the pin bears against the walls of the central passage of the bearing. The bearing is made of carbon and the pin is made of hardened steel, thus the bearing wears at a rate that exceeds that of the pin. Since the bearing rotates with the shaft, it is worn evenly, although subjected to radial load. This construction of the bearing assembly, in the same manner as the embodiment described above, can also be adapted to utilize a segmented bearing similar to that shown in FIGURE 4. To compensate for wear, springs or other bias means would be disposed to force the bearing inwardly toward the pin as the bearing is worn, thus compensating for wear.

This invention is useful in any centrifugal pump since the impeller shafts of all such pumps normally impose a net radial load on the bearings used to support them. However, the instant invention is particularly suited for canned pumps since in a canned pump the problem of bearing wear is particularly acute due to the fact that bearing failure can result in damage to the motor. This occurs when the eccentric motion of the shaft causes the rotor to abrade against the walls of the rotor chamber. Such damage to the motor often requires that the entire pump be replaced. The instant invention overcomes this problem and provides improved bearing performance in canner pumps as well as other centrifugal pumps.

Having regard to the foregoing disclosure, the following is claimed as the inventive and patentable features thereof:

1. A motor pump, comprising, in combination, a housing having an inlet and an outlet; an impeller rotatably mounted within the housing, an impeller shaft supporting the impeller; and a bearing assembly supporting the impeller shaft, said bearing assembly comprising a bearing support fixed in position relative to the shaft, and a bearing fixed for rotation with the shaft and adapted to rotate against the bearing support, said bearing having a surface of a material that wears at a rate that exceeds that of the surface of the bearing support, whereby as the shaft rotates, the bearing surface is worn more rapidly than the bearing support surface.

2. A motor pump in accordance with claim 1, in which the bearing comprises a relatively soft sleeve slipped over the shaft and fixed thereto.

3. A motor pump in accordance with claim 1, in which the bearing support includes a support and a bearing liner disposed between the bearing and the support, said bearing liner being constructed of a material that is worn at a rate that is less than that of the bearing.

4. A motor pump in accordance with claim 1, in which the bearing is cylindrical.

5. A motor pump in accordance with claim 1, in which the bearing is made of carbon.

6. A motor pump in accordance with claim 1, in which the bearing is made of nylon.

7. A motor pump in accordance with claim 1, in which the bearing is made of polytetrafluoroethylene.

8. A motor pump in accordance with claim 1, having a tapered bearing disposed within a matching tapered bearing support, and bias means holding the tapered bearing portions in abutting relationship.

9. A motor pump in accordance with claim 1, in which the bearing support is a socket enclosing the bearing, that is rotatably inserted therein.

10. A motor pump in accordance with claim 1, having a segmented cylindrical bearing and bias means holding the bearing segments against the bearing support.

11. A motor pump in accordance with claim 3, wherein the bearing liner is made of polished and hardened steel.

12. A motor pump in accordance with claim 1, in which the bearing is press-fitted onto the shaft.

13. A motor pump in accordance with claim 1, in which the bearing is held for rotation with the shaft by a key.

14. A motor pump in accordance with claim 1, in which the bearing is supported on a pin that fits within a passage in the bearing.

15. A centrifugal canned motor pump, comprising, in combination, a housing having a pump chamber and a motor chamber, the pump chamber having an inlet and an outlet; an impeller in the pump chamber; a mainshaft fixed to the impeller for rotating the impeller and extending from the pump chamber into the motor chamber; at least two bearing assemblies supporting the main shaft in the motor chamber at opposite ends thereof, each of said bearing assemblies comprising a bearing support having a socket for reception of a bearing; a bearing liner lining the walls of the socket; a cylindrical bearing fitted over to the shaft for rotation therewith and inserted within the bearing liner, said bearing having a surface of a material that wears at a rate that exceeds that of the surface of the bearing liner, whereby as the shaft rotates, the bearing is worn more rapidly than the bearing liner.

16. A motor pump in accordance with claim 15, in which the bearing is made of carbon.

17. A motor pump in accordance with claim 15, in which the bearing is held for rotation with the shaft by a key.

References Cited
UNITED STATES PATENTS

| | | | |
|---|---|---|---|
| 1,398,049 | 11/1921 | Swazze | 308—237 |
| 1,909,410 | 5/1933 | Klosson | 308—237 |
| 2,223,518 | 12/1940 | Heuberger | 308—237 |
| 3,195,466 | 7/1965 | Young | 103—87 |

ROBERT M. WALKER, *Primary Examiner.*

U.S. Cl. X.R.

308—237